Patented Oct. 29, 1946

2,410,071

UNITED STATES PATENT OFFICE 2,410,071

CATALYTIC ALKYLATION PROCESS

Aaron W. Horton, Detroit, Mich., and John W. Brooks, Wenonah, and Arlie A. O'Kelly, Woodbury, N. J., assignors to Socony-Vacuum Oil Company, Incorporated, a corporation of New York No Drawing. Application September 17, 1943, Serial No. 502,812

14 Claims. (Cl. 260—683.4)

This invention relates to the alkylation of paraffinic hydrocarbons with olefinic hydrocarbons and is more particularly concerned with the production of high octane motor fuel by the catalytic alkylation of paraffinic hydrocarbons with olefinic hydrocarbons.

It is well known in the art to polymerize olefinic hydrocarbon gases to produce motor fuels having constituents of an unsaturated character. Various commercial processes have been proposed for ultimately effecting the desired polymerization of the olefinic hydrocarbons. These processes have been predicated upon the dictates of the chemical nature of the stocks available as well as engineering considerations such as initial and operation costs; their essential feature being that in the course of treating the materials, the olefinic hydrocarbons produced in the earlier stages of the process, are eventually polymerized to gasoline. Accordingly, hydrocarbon gases may be passed along with cracking stock or naphtha through a cracking still to crack and polymerize such gases to gasoline simultaneously with the cracking or reforming, or paraffinic hydrocarbon gases may be separately cracked to olefinic hydrocarbon gases and these gases are subsequently passed with naphtha through a polymerizing and reforming still. In some instances, the processes involves the use of catalysts for facilitating the cracking and/or polymerization operations.

It is also well known in the art, to combine paraffinic hydrocarbons directly with olefinic hydrocarbons by processes broadly called alkylation processes, to produce motor fuels having constituents of saturated character. In alkylation processes, a charge comprising a mixture of a paraffinic hydrocarbon, called the paraffinic reactant, and an olefinic hydrocarbon, called the olefinic reactant, is subjected to high temperature and pressure to produce a saturated alkylate product. Since conditions of alkylation also cause polymerization of the olefinic reactant, it is necessary to maintain a relatively low concentration of the olefinic reactant in the charge. The only limit to the pressure used appears to be the feasibility of maintaining high pressures. On the other hand, the temperature used is limited by degradation of the hydrocarbon reactants in the charge to low molecular weight hydrocarbons and the occurrence of side reactions, including polymerization of the olefinic reactant, under high temperature conditions, that substantially reduce the purity of the product obtained.

Alkylation may be conducted at high temperatures and pressures, on the order of over 900° F. and over 4000 pounds per square inch gauge, respectively; or may be conducted in the presence of alkylation catalysts at lower temperatures and pressures, thereby assuring a high yield of desired alkylate by avoiding extensive degradation of the reactants, the occurrence of side and secondary reactions, and appreciable polymerization of the olefinic reactant. The two methods are known as thermal alkylation and as catalytic alkylation, respectively.

Several methods are known for the catalytic alkylation of isoparaffinic hydrocarbons with olefinic hydrocarbons. For instance, it is known to alkylate isoparaffinic hydrocarbons with olefinic hydrocarbons in the presence of sulfuric acid, phosphoric acid, metal phosphates, metal halides, activated clays and the like, as catalysts. In these catalytic alkylation processes, the hydrocarbon reactants form with the alkylation catalysts, a heterogeneous system during the alkylation operation. Since under alkylation conditions, the catalytic activity of the alkylation catalysts appears to be predicated upon contact between the catalysts and the gaseous hydrocarbon reactants at the interfaces therebetween, in these processes, the catalysts are used in amounts varying between 10% and 200% by weight, on the charge, depending on the catalyst used. Due to these comparatively high amounts, where possible, recovery and regeneration of the catalysts have been proposed. This, of course, involves high initial and operation costs. Further, it is also known that certain substances called promoters, promote the catalytic action of these alkylation catalysts. Accordingly, several processes have been proposed wherein small amounts of these promoters, on the order of about 1% to 3% by weight on the charge, are added to the catalysts to promote their alkylation catalytic activity.

A copending application, Ser. No. 502,013, filed September 11, 1943, in which one of the inventors of the present application is coinventor, is directed to the process of alkylating paraffinic and isoparaffinic hydrocarbons with olefinic hydrocarbons, which comprises contacting a paraffinic or isoparaffinic hydrocarbon and an olefinic hydrocarbon in a reaction zone under alkylating conditions, with small or promoter amounts of what has been termed therein, a homogeneous gaseous phase alkylation catalyst consisting essentially of a material that forms with the hydrocarbon reactants, a single homogeneous gaseous phase under the alkylation conditions of the reaction zone. The alkylation conditions of the process of this copending application comprise a broad temperature range of about 590° F. to about 850° F., preferably, about 650° F. to about 825° F.; and pressures of at least 500 pounds per square inch gauge, preferably, at least 1500 pounds per square inch gauge.

Another copending application, Ser. No. 502,-813, filed September 17, 1943, in which the inventors of the present application are coinventors, is directed to the process of alkylating isobutane with propylene, which comprises contacting isobutane with propylene in a reaction zone under closely controlled alkylating conditions, with promoter or small amounts of the homogeneous gaseous phase catalysts broadly disclosed in the copending application referred to hereinabove, the closely controlled alkylating conditions including a temperature range of about 750° F. to about 850° F., preferably, about 775° F. to about 825° F., and pressures of at least 2500 pounds per square inch gauge. In the alkylation of isobutane with propylene in the presence of homogeneous gaseous phase catalysts, we found that the alkylate obtained included constituents that are entirely different from the constituents of the hydrocarbon alkylate obtained in the alkylation of isobutane with propylene in the presence of known heterogeneous alkylation catalysts, i. e., AlCl₃, H₂SO₄, and the like. Thus when heterogeneous alkylation catalysts are used, 2,3-dimethylpentane and 2,4-dimethylpentane are important constituents of the hydrocarbon alkylate obtained. On the other hand, in our process, triptane or 2,2,3-trimethylbutane, 2,2-dimethylpentane, and 2-methylhexane are the predominant constituents of the hydrocarbon alkylate. In our copending application, we postulated the formation of these three compounds as follows:

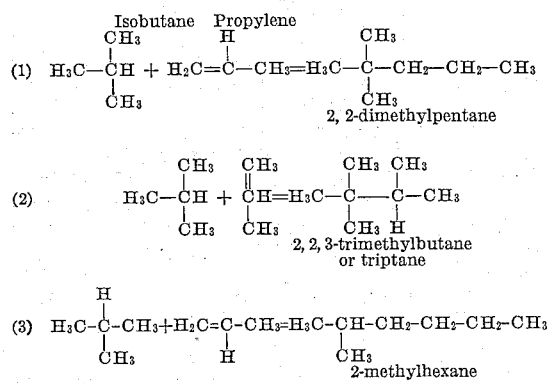

From a motor fuel standpoint, the 2,2-dimethylpentane produced by the first reaction, has an octane number of about 80 C. F. R. motor method; the triptane produced by the second reaction has an octane number of well over 100 and the 2-methylhexane obtained in the third reaction has an octane number of about 45. In view of the foregoing, in the manufacture of high octane motor fuel by the alkylation of isobutane with propylene, alkylation conditions that favor the production of triptane obviously are preferable. Further, since neohexane which may be produced by the alkylation of isobutane with ethylene, has an octane number of 93.4, and since 2,3-dimethylpentane and 2,4-dimethylpentane which are the predominant constituents of the alkylate obtained in the alkylation of isobutane with propylene in the presence of heterogeneous alkylation catalysts have octane numbers of 89 and 82, respectively, the importance of the alkylation of isobutane with propylene in the presence of homogeneous gaseous phase catalysts under alkylation conditions that favor the production of triptane is manifest. We also found that in actual practice, it was impossible to obtain triptane exclusively, appreciable amounts of 2,2-dimethylpentane and 2-methylhexane being always formed.

The specific classes of homogeneous gaseous phase catalysts claimed in the above-noted copending applications are organic halides, and, more particularly, organic chlorides and organic bromides.

We have found that elemental halogens are suitable homogeneous gaseous phase alkylation catalysts and that isoparaffinic and paraffinic hydrocarbons may be efficiently alkylated with olefinic hydrocarbons to produce high yields of high octane gasoline by using small or promoter amounts of elemental halogens to form with the hydrocarbon reactants, a single homogeneous gaseous phase during the alkylation operation.

We have also found that elemental halogens are suitable homogeneous gaseous phase catalysts in the catalytic alkylation of isobutane with propylene under the controlled conditions of alkylation described in our copending application Ser. No. 502,813, filed September 17, 1943.

It is an object of the present invention to provide an efficient process for catalytically alkylating isoparaffinic or paraffinic hydrocarbons with olefinic hydrocarbons. Another object of the present invention is to provide an efficient process for catalytically alkylating either normal paraffinic hydrocarbons or isoparaffinic hydrocarbons with olefinic hydrocarbons to produce high yields of high octane gasoline. A more specific object is to provide a process for catalytically alkylating isobutane with propylene to produce high yields of high octane gasoline. A very important object of the present invention is to afford a process capable of carrying out the above objects by using small or promoter amounts of elemental halogens that form with the hydrocarbon reactants, a single homogeneous gaseous phase during the alkylation operation. Other objects and advantages of the present invention will become apparent to those skilled in the art from the following description.

Broadly stated, our invention provides a process for alkylating paraffinic or isoparaffinic hydrocarbons, particularly isobutane, with olefinic hydrocarbons, particularly propylene, which comprises contacting the paraffinic and olefinic hydrocarbons in gaseous phase and in a reaction zone under alkylating conditions, with small or promoter amounts of alkylation catalyst consisting essentially of elemental halogens, particularly chlorine and bromine, that forms with the hydrocarbons reactants, a single homogeneous gaseous phase under the alkylation conditions of the reaction zone.

An important feature of the process of the present invention is the fact that, contrary to the known catalytic alkylation process of the prior art which are only capable of alkylating isoparaffinic hydrocarbons, our process is capable of alkylating either normal paraffinic or isoparaffinic hydrocarbons with substantially equal ease.

Another important feature of the process of the present invention is the relatively low temperature that may be used. As a result, degradation of the hydrocarbon reactants in the charge to low molecular weight hydrocarbons and the pronounced occurrence of side reactions including polymerization of the olefinic hydrocarbons are substantially completely avoided. Consequently, in our process, we obtain high yields of a high grade product that is almost entirely paraffinic in nature and is substantially free from impurities.

A very important feature of the present invention is the fact that, contrary to known catalytic processes of the prior art in which the hydrocarbon reactants being processed form with the alkylation catalysts, a heterogeneous system during the alkylation operation, the alkylation process of our invention employs alkylation catalysts consisting essentially of materials that form with the hydrocarbon reactants being processed, a single homogeneous gaseous phase under alkylating conditions. The alkylation catalysts of the present invention may be called therefore, homogeneous phase catalysts in contradistinction to the alkylation catalysts of the prior art which may be referred to as heterogeneous catalysts. Accordingly, as a result of the catalyst's being in the same phase or state as the hydrocarbon reactants being processed, fouling of the catalyst is substantially eliminated and agitation and/or mixing problems are non-extant. Further, since the catalytic activity of alkylation catalysts appears to be predicated somewhat upon contact between the catalysts and the gaseous hydrocarbon reactants at the interfaces therebetween, it follows that the catalytic efficiency of a given catalyst increases with the increase in area of interfacial contact, other variables remaining constant. Hence, since the homogeneous catalysts of our process inherently furnish the greatest possible "interfacial contact" between the catalysts and the hydrocarbon reactants under the conditions of alkylation, efficient catalytic activity with a concomitant high yield of high grade alkylate is achieved using relatively small amounts of homogeneous gaseous phase catalyst.

In view of the foregoing, an operation feature of the process of the present invention that is of considerable practical importance is that small or promoter amounts of elemental halogens are used as alkylation catalysts. These amounts are so small that they may be discarded feasibly, thereby obviating recovery and regeneration problems and eliminating high initial and operation costs.

A most important feature of the present invention is that high yields of high octane motor fuel are obtained by alkylating isobutane with propylene in the presence of elemental halogens, particularly, chlorine and bromine. In the alkylation of isobutane with propylene, we especially prefer to use bromine as our catalyst. We have found that when bromine is used as the homogeneous gaseous phase catalyst in the process of the present invention, the alkylate contains an appreciably larger proportion of the triptane- and 2,2-dimethylpentane-containing fraction. However, when bromine is used, the concentration of the triptane in the triptane- and 2,2-dimethylpentane-containing fraction is always lower. The higher yield of 2,2-dimethylpentane thus obtained, is accompanied by a decrease in the 2-methylhexane. Therefore, since it thus appears that bromine favors the first and second alkylation reactions referred to hereinabove; while chlorine favors the first and third alkylation reactions referred to; and since the first and second alkylation reactions referred to, produce products that have the highest and higher octane numbers, respectively, the advantages of employing bromine as the homogeneous gaseous phase alkylation catalyst for the manufacture of high octane motor fuel by our process are manifest. By way of illustrative example, it is possible to obtain a fraction by our process, containing 10 parts of triptane, 85 parts of 2,2-dimethylpentane and only 5 parts of 2-methylhexane. This fraction is considerably larger per pass when bromine is used as the catalyst, than when chlorine is employed. The overall per pass yield of triptane is thus slightly increased while the overall per pass yield of 2,2-dimethylpentane is increased appreciably. Therefore, even though the yield of triptane is only slightly increased, it still seems favorable to produce 80 octane 2,2-dimethylpentane at the expense of 45 octane 2-methylhexane.

The amount of halogen used in our process varies between about 0.5% and about 3%, and preferably, between about 1% and about 1.25%, with respect to the total charge of hydrocarbon reactants. It must be noted, however, that larger amounts of halogen may be employed if desired, although no additional advantages result therefrom.

The paraffinic and olefinic hydrocarbons to be used in our process may be derived from any suitable source, as is well known in the art, and may be used either in the pure state or in admixture with other constituents not undesirable. The paraffinic and olefinic hydrocarbons usually employed in the preferred operation of manufacturing motor fuels will be the normally gaseous paraffinic hydrocarbons, except methane and ethane, and the normally gaseous olefinic hydrocarbons, as is well understood in the art. Here again our process has a distinct advantage over many of the prior art processes in that the olefin ethylene may be used for alkylating the paraffinic hydrocarbons. It is well known that ethylene cannot be used in many catalytic processes, including the sulfuric acid process, whereby the supply of available olefinic hydrocarbons is restricted. Therefore, an important aspect of the present invention is the fact that butane, for instance, may be alkylated with ethylene.

A conventional and preferred source of paraffinic and olefinic hydrocarbons is the fixed gases obtained around petroleum refineries. These fixed gases may furnish substantially all the desired paraffinic and olefinic hydrocarbons, or it may be necessary or desirable to obtain additional supplies, as is well understood. Additional olefinic hydrocarbons, if required, may be formed from a portion of the paraffinic hydrocarbons. On the other hand, additional paraffinic hydrocarbons may be admixed to increase the concentration of paraffinic hydrocarbons to a desired magnitude.

In carrying out our process, we use temperatures varying between about 590° F. and about 850° F., and preferably temperatures varying between about 650° F. and about 825° F. In the alkylation of isobutane with propylene, however, we have found, as disclosed in our copending application Ser. No. 502,813, filed September 17, 1943, that the best yields of desired alkylate are obtained when the alkylation is conducted at temperatures falling within about 750° F. to about 850° F., and preferably, about 775° F. to about 825° F. The alkylate produced under these conditions contains no more than 5% of olefinic hydrocarbons and no aromatics so that the predominance of alkylation obtained thereby is a distinct feature of the process. Under appreciably higher temperature conditions, side reactions occur that substantially reduce the purity of the product obtained. In the alkylation of isobutane with propylene in accordance with the process of the present invention, it must be noted that even within the preferred temperature range, side reactions occur that account for substantial portions of the total alkylate, but a fraction boiling at 79° C. to 82° C. and consisting of 15 parts of triptane to 85 parts of 2,2-dimethylpentane may be obtained. This reaction product is obtained in best yields by injecting the reactants and the halogen catalyst separately, into the reaction zone at optimum reaction temperature. The method of conducting alkylation with homogeneous gaseous phase catalysts embodying this feature forms the subject matter of a copending application, Ser. No. 516,242, filed December 30, 1943.

The pressure to be used in our process may vary from about 500 pounds per square inch to about 6000 pounds per square inch or more, and preferably from about 2500 pounds per square inch to about 6000 pounds per square inch for the alkylation of isobutane with propylene, the most suitable pressure being more or less dependent upon the particular temperature involved. In general, the higher the pressure, the higher the yield of alkylate. Accordingly, the criterion for establishing an upper limit to the pressure range used is primarily the feasibility of maintaining such pressure.

In our process it is desirable, as in known isoparaffin-olefin alkylation processes, to keep the concentration of the olefinic hydrocarbons relatively low during the alkylation reaction in order to eliminate as much olefin polymerization as possible. Accordingly, it is advisable to maintain the olefin concentration in the charge below about 25% by volume, and preferably between about 7% and about 12% by volume.

The alkylate product that we obtain distills over a fairly large boiling range, but a greater part of the alkylate, usually from about 85% to about 90%, distills in the boiling range of aviation gasolines. The iodine number of the aviation distillate is low, on the order of about 5 to 10. As mentioned hereinabove, the alkylate product consists predominantly of branched paraffinic hydrocarbons.

To illustrate our invention, we set forth below in Tables I and II, typical data obtained in carrying out our process:

*Table I.—Batch operation*

|  | Run 1 | Run 2 |
| --- | --- | --- |
| Paraffin, per cent by wt | Isobutane, 90 | Isobutane, 90. |
| Olefin, per cent by wt | Propylene, 10 | Propylene, 10. |
| Catalyst | Chlorine | Bromine. |
| Amount of catalyst, wt. per cent in charge | 1.2 | 1.2. |
| Temperature, °F | 750 | 750. |
| Pressure, #/sq. in. gauge | 4,000 | 4,000. |
| Reaction time in minutes | 30 | 30. |
| *Product* | | |
| Alkylate yield weight, per cent of charge | 16 | 16. |
| Alkylate, weight per cent boiling between— | | |
| 70° C.–76° C | 4 | 4. |
| 76° C.–79° C | 4 | 5. |
| 79° C.–82° C | 22 | 35. |
| 82° C.–86° C | 2 | 1. |
| 86° C.–92° C | 11 | 5. |

*Table II.—Continuous operation*

|  | Run 3 | Run 4 |
| --- | --- | --- |
| Paraffin, percent by wt | Isobutane, 90 | Isobutane, 90. |
| Olefin, percent by wt | Propylene, 10 | Propylene, 10. |
| Catalyst | Chlorine | Bromine. |
| Amount of catalyst, wt. % in charge | 2.7 | 1.1. |
| Temperature, °F | 800 | 800. |
| Pressure, #/sq. in. gauge | 6,000 | 6,000. |
| Reaction time in minutes | 25 | 25. |
| *Product* | | |
| Alkylate yield, weight percent of charge | 15.3 | 12.5. |
| Alkylate, weight percent boiling between— | | |
| 76° C.–86° C | 36 | 40. |

It must be noted that run 2, which was made under identical conditions as run 1, with the exception that bromine was used as the homogeneous gaseous phase catalyst, gave a higher yield of the triptane-containing fraction boiling at 79° C. to 82° C. This appears to be due to the tendency of bromine to catalyze the reactivity of the tertiary isobutane hydrogen with resultant formation of larger amounts of 2,2-dimethylpentane and triptane, boiling at 80–81° C. This being a desirable direction for this particular reaction to go, indicates the advantages of bromine over chlorine as the catalyst. Infra red data show, however, that the alkylate formed by catalysts with chlorine is richer in desirable triptane than that produced by bromine.

The alkylate produced by our process is contaminated by various halogen compounds which are present in small concentration. These compounds cause a negative susceptibility to tetraethyl lead, and, therefore, should be removed. Removal of these halogen compounds is possible in a variety of ways, as set forth in copending applications Ser. No. 477,450, filed February 27, 1943; Ser. No. 502,504, filed September 15, 1943; and Ser. No. 504,436, filed September 30, 1943.

Although the present invention has been described in conjunction with preferred embodiments, it is to be understood that modifications and variations may be resorted to without departing from the spirit and scope of the invention as those skilled in the art will readily understand. Such variations and modifications are considered to be within the purview and scope of the appended claims.

We claim:

1. The process of manufacturing high octane gasoline by alkylating isobutane with propylene, which comprises contacting isobutane and propylene in a reaction zone under alkylating conditions including a temperature varying between about 775° F. and about 825° F. and a pressure of at least 2500 pounds per square inch, with an alkylation catalyst consisting essentially of bromine in amounts varying between about 1% and about 1.25% of the charge, and maintaining an excess of isobutane over propylene in said reaction zone so that alkylation is the principal reaction.

2. In a process of manufacturing high octane gasoline by alkylating a light paraffin with a light olefin in a reaction zone under alkylating conditions and in the presence of catalytic material; the improvement which comprises contacting said light paraffin and light olefin in gaseous phase and in said reaction zone under alkylating conditions including a temperature varying between about 650° F. and about 825° F. and a pressure of at least 1500 pounds per square inch, with an alkylation catalyst consisting essentially of a halogen selected from the group consisting of chlorine and bromine which forms with said light paraffin and light olefin, a single homogeneous gaseous phase under said alkylating conditions, and maintaining an excess of the paraffinic reactant over the olefinic reactant in said reaction zone so that alkylation is the principal reaction.

3. In a process of alkylating a light paraffin with a light olefin in a reaction zone under alkylating conditions and in the presence of catalytic material; the improvement which comprises contacting said light paraffin and light olefin in said reaction zone under alkylating conditions including a temperature varying between about 650° F. and about 825° F. and a pressure of at least 1500 pounds per square inch, with an alkylation catalyst consisting essentially of a halogen selected from the group consisting of chlorine and bromine, in amounts varying between about 1% and aobut 1.25% of the charge, and maintaining an excess of the paraffinic reactant over the olefinic reactant in said reaction zone so that alkylation is the principal reaction.

4. The process of manufacturing triptane by alkylating isobutane with propylene, which comprises contacting isobutane and propylene in gaseous phase and in a reaction zone under alkylating conditions including a temperature varying between about 775° F. and about 825° F. and a pressure of at least 2500 pounds per square inch, with an alkylation catalyst consisting essentially of bromine which forms with said isobutane and propylene, a single homogeneous gaseous phase under said alkylating conditions, and maintaining an excess of isobutane over propylene in said reaction zone so that alkylation is the principal reaction.

5. The process of manufacturing high-octane gasoline, which comprises contacting isobutane and propylene in a reaction zone under alkylating conditions including temperatures varying between about 750° F. and about 850° F. and pressures of at least 2500 pounds per square inch, with an alkylation catalyst consisting essentially of bromine, and maintaining an excess of isobutane over propylene in said reaction zone so that alkylation is the principal reaction.

6. The process of alkylating isobutane with propylene, which comprises contacting said isobutane and said propylene in a reaction zone under alkylating conditions including temperatures varying between about 750° F. and about 850° F. and pressures of at least 2500 pounds per square inch, with an alkylation catalyst consisting essentially of chlorine, and maintaining an excess of isobutane over propylene in said reaction zone so that alkylation is the principal reaction.

7. The process of manufacturing high-octane gasoline, which comprises contacting a light paraffinic hydrocarbon and a light olefinic hydrocarbon in a reaction zone under alkylating conditions including temperatures varying between about 650° F. and about 825° F. and pressures of at least 1500 pounds per square inch, with an alkylation catalyst consisting essentially of bromine, and maintaining an excess of the light paraffinic hydrocarbon over the light olefinic hydrocarbon in said reaction zone so that alkylation is the principal reaction.

8. The process of claim 7 wherein the alkylation catalyst consists essentially of chlorine.

9. The process of alkylating a paraffinic hydrocarbon with an olefinic hydrocarbon, which comprises contacting said paraffinic hydrocarbon and said olefinic hydrocarbon in a reaction zone under alkylating conditions including temperatures varying between about 590° F. and about 850° F. and pressures of at least 500 pounds per square inch, with an alkylation catalyst consisting essentially of bromine, and maintaining an excess of paraffinic hydrocarbon over the olefinic hydrocarbon in said reaction zone so that alkylation is the principal reaction.

10. The process of claim 9 wherein the alkylation catalyst consists essentially of chlorine.

11. The process of manufacturing high-octane gasoline, which comprises contacting isobutane and propylene in a reaction zone under alkylating conditions including temperatures varying between about 775° F. and about 825° F. and pressures of at least 2500 pounds per square inch, with an alkylation catalyst consisting essentially of chlorine, and maintaining an excess of isobutane over propylene in said reaction zone so that alkylation is the principal reaction.

12. The process of manufacturing triptane, which comprises contacting isobutane and propylene in a reaction zone under alkylating conditions, with an alkylation catalyst consisting essentially of a halogen selected from the group consisting of chlorine and bromine, and maintaining an excess of isobutane over propylene in said reaction zone so that alkylation is the principal reaction.

13. The process of manufacturing high-octane gasoline, which comprises contacting a light paraffinic hydrocarbon and a light olefinic hydrocarbon in a reaction zone under alkylating conditions, with an alkylation catalyst consisting essentially of a halogen selected from the group consisting of chlorine and bromine, and maintaining an excess of light paraffinic hydrocarbon over the light olefinic hydrocarbon in said reaction zone so that alkylation is the principal reaction.

14. The process of alkylating a paraffinic hydrocarbon with an olefinic hydrocarbon, which comprises contacting said paraffinic hydrocarbon and said olefinic hydrocarbon in a reaction zone under alkylating conditions, with an alkylation catalyst consisting essentially of a halogen selected from the group consisting of chlorine and bromine, and maintaining an excess of the paraffinic hydrocarbon over the olefinic hydrocarbon in said reaction zone so that alkylation is the principal reaction.

AARON W. HORTON.
JOHN W. BROOKS.
ARLIE A. O'KELLY.

Certificate of Correction

Patent No. 2,410,071.

October 29, 1946.

AARON W. HORTON ET AL.

It is hereby certified that errors appear in the printed specification of the above numbered patent requiring correction as follows: Column 1, line 29, for "involves" read *involve*; column 5, line 20, before "phase" insert *gaseous*; column 8, lines 31 and 32, for "catalysts" read *catalysis*; column 9, line 23, for "aobut" read *about*; and that the said Letters Patent should be read with these corrections therein that the same may conform to the record of the case in the Patent Office.

Signed and sealed this 25th day of February, A. D. 1947.

[SEAL]

LESLIE FRAZER,
*First Assistant Commissioner of Patents.*